United States Patent [19]
Scott et al.

[11] Patent Number: 5,439,987
[45] Date of Patent: Aug. 8, 1995

[54] HIGH HEAT DEFLECTION TEMPERATURE BLENDS OF CERTAIN POLYESTERS WITH POLYETHERIMIDES

[75] Inventors: Christopher E. Scott; Max F. Meyer; Kenneth E. Breeding; Jeffrey T. Owens, all of Kingsport, Tenn.

[73] Assignee: Eastman Chemical Company, Kingsport, Tenn.

[21] Appl. No.: 251,761

[22] Filed: May 31, 1994

[51] Int. Cl.$^6$ ............................................. C08L 77/00
[52] U.S. Cl. ................................ 525/425; 528/308.7
[58] Field of Search ...................... 525/425; 528/308.7

[56] References Cited

U.S. PATENT DOCUMENTS

| | | | |
|---|---|---|---|
| 3,847,867 | 11/1974 | Heath et al. | 528/26 |
| 3,847,869 | 11/1974 | Williams | 528/170 |
| 3,850,885 | 11/1974 | Takekoshi et al. | 528/170 |
| 3,852,242 | 12/1974 | White | 528/170 |
| 3,855,178 | 12/1974 | White et al. | 524/392 |
| 3,887,588 | 6/1975 | Cook et al. | 549/243 |
| 4,024,110 | 5/1977 | Takekoshi | 528/170 |
| 4,107,511 | 4/1977 | Williams, III | 528/170 |
| 4,141,927 | 2/1979 | White et al. | 525/425 |
| 4,250,279 | 2/1981 | Robeson et al. | 525/425 |
| 4,687,819 | 8/1987 | Quinn et al. | 525/425 |
| 4,908,418 | 3/1990 | Holub | 525/425 |
| 4,908,419 | 3/1990 | Holub et al. | 525/425 |
| 5,284,903 | 2/1994 | Minnick | 525/425 |

*Primary Examiner*—Ana L. Carrillo
*Attorney, Agent, or Firm*—Karen A. Harding; Harry J. Gwinnell

[57] ABSTRACT

A thermoplastic molding composition having a high neat deflection temperature but a relatively low melt extrusion temperature is formed by blending a polyetherimide with about 35 to about 80 weight percent of a copolyester of terephthalic and/or isophthalic acid and a glycol component comprising ethylene glycol and up to about 60 mol percent of 1,4-cyclohexanedimethanol. The blend also has a high flexural modulus and can be used to form plastic articles that can be molded at moderate temperatures but retain flexural strength at elevated temperatures. Certain compositions of the invention are clear, single phase solid solutions.

13 Claims, 2 Drawing Sheets

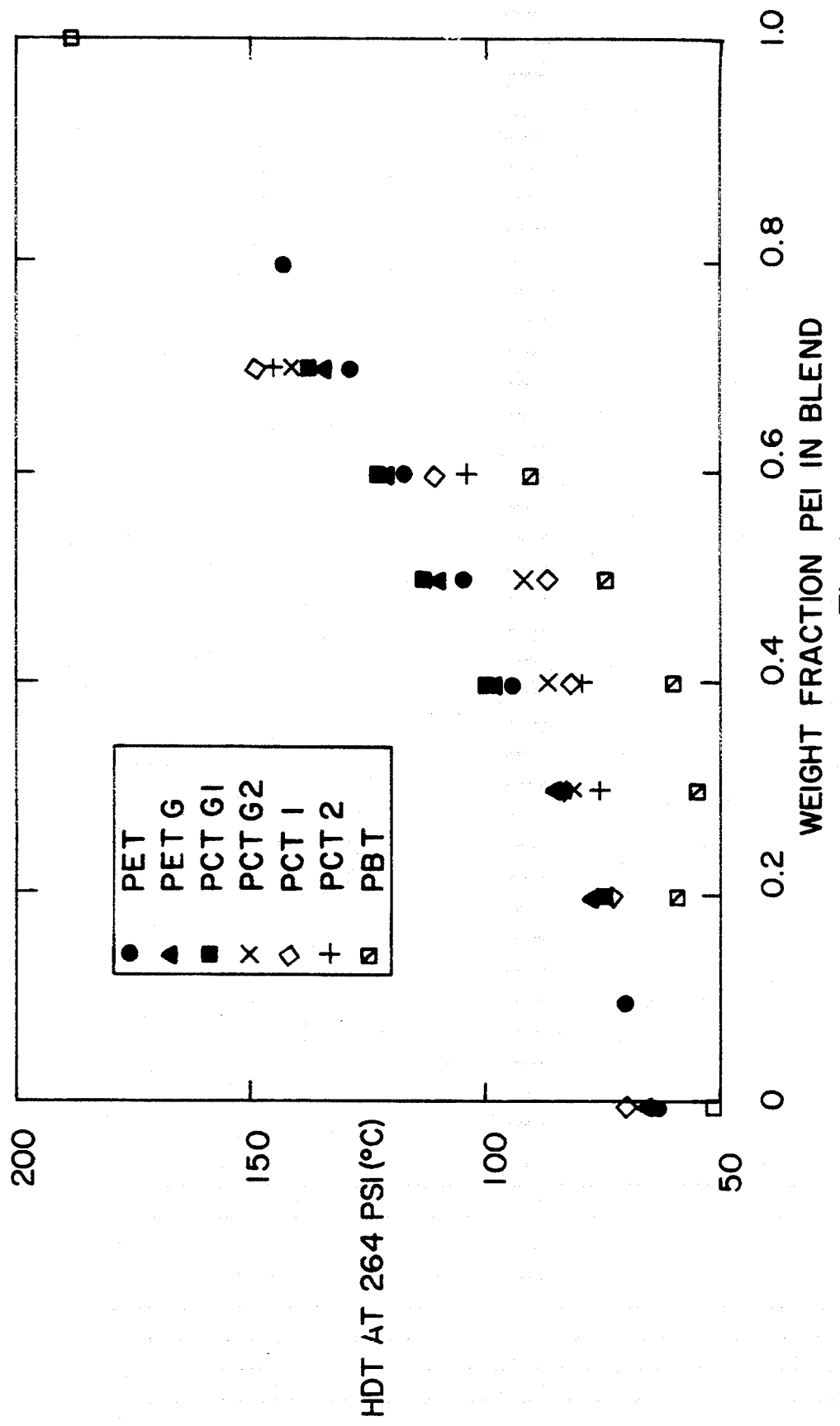

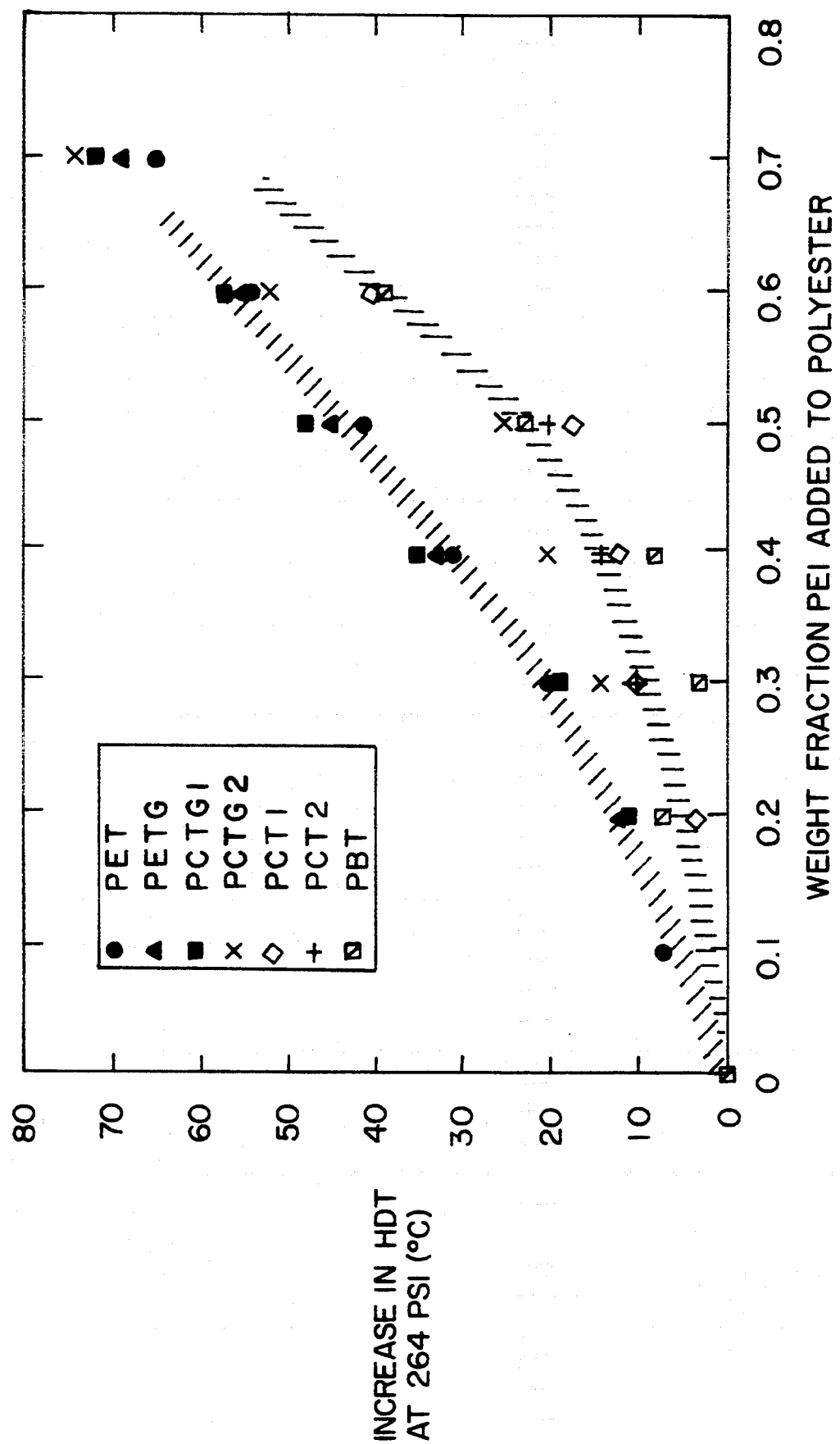

HIGH HEAT DEFLECTION TEMPERATURE BLENDS OF CERTAIN POLYESTERS WITH POLYETHERIMIDES

FIELD OF THE INVENTION

This invention relates to polymer blends and, more particularly, to thermoplastic molding compositions of high heat deflection temperature that are blends of certain copolyesters with polyetherimides.

BACKGROUND OF THE INVENTION

Polyesters and copolyesters are useful materials for injection molding and extrusion, but their heat deflection temperatures are often relatively low. Polyetherimides are plastics with excellent flexural strength and performance at high temperature; however high temperature are generally required to process them. Polyetherimides are also generally more expensive than polyesters. Blending polyesters with polyetherimides could provide compositions that have satisfactorily high heat deflection temperatures together with processing temperatures lower than those required for pure polyetherimides. Further, economical blends having good flexural strength would be desirable for certain uses.

Blends of polyesters and polyetherimides are disclosed in U.S. Pat. No. 4,141,927. Polyesters of terephthalic acid and isophthalic acid with ethylene glycol are disclosed. Cyclohexanediol is mentioned as a possible glycol but there is no suggestion of cyclohexane-1,4-dimethanol. No mention is made of blends having high heat deflection temperatures and low processing temperatures.

Blends of polyarylates with polyetherimides are disclosed in U.S. Pat. Nos. 4,250,279 and 4,908,419. Three component blends of polyetherimide, polyester, and another polymer are also disclosed in U.S. Pat. Nos. 4,687,819 and 4,908,418. U.S. Pat. No. 4,908,418 mentions a polyester of 1,4-cyclohexanedimethanol as a suitable polyester for the three-component blend. In none of these references is there a suggestion of a polymer blend having the properties of high heat deflection temperature and low melt processing temperature.

The present invention provides novel thermoplastic blends of polyetherimides and copolyesters that have in combination a lower processing temperature than the polyetherimide, a desirably high heat deflection temperature and a high flexural modulus. In addition, certain compositions of the invention form single phase solid solutions of excellent clarity. These compositions are especially useful for forming clear molded articles having good high temperature properties.

BRIEF SUMMARY OF THE INVENTION

The composition of the invention is a thermoplastic polymer blend comprising about 20 to 65 weight percent of a polyetherimide and from about 80 to 35 weight percent of a copolyester of
(a) an acid component comprising terephthalic acid or isophthalic acid or a mixture of said acids, and
(b) a glycol component comprising ethylene glycol and up to about 60 mol percent 1,4-cyclohexanedimethanol.

BRIEF DESCRIPTION OF THE DRAWINGS

FIG. 1 is a graph of weight fraction of polyetherimide in a polymer blend versus heat deflection temperature.

FIG. 2 is a graph of weight fraction of polyetherimide in a blend versus heat deflection temperature increases.

DETAILED DESCRIPTION OF THE DRAWINGS

In the compositions of the invention polyetherimides are blended with certain copolyesters. The copolyester of the blend is preferably a poly(cyclohexane-1,4-dimethylene-co-ethylene terephthalate) (PCT-co-PET) with up to about 60 mol percent of 1,4-cyclohexanedimethanol in the glycol portion of the copolyester. The acid component of the copolyester can also comprise isophthalic acid or a mixture of isophthalic and terephthalic acids. The compositions of the invention, which comprise a blend of these polyesters with from about 20 to about 65 weight percent polyetherimide, can be processed at lower melt temperatures than the polyetherimide, and exhibit unexpectedly high heat deflection temperatures and have high flexural strength. Similar advantages are also obtained when the copolyesters of the blend are modified with minor amounts of other acids or glycols.

The novel polyetherimide/polyester blends comprise about 20 to about 65 weight percent of a polyetherimide of the formula:

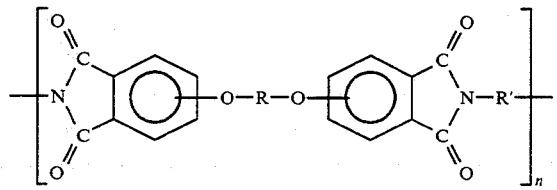

where n represents a whole number greater than 1, for example, 10 to 10,000 or more. The radical —O—R—O— is in the 3— or 4— and 3' and 4'-positions. The radical —R— is a member of the class consisting of:

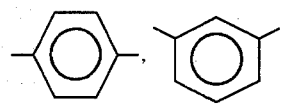

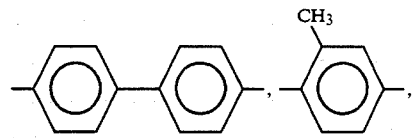

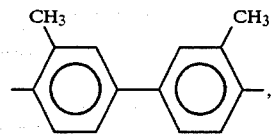

-continued

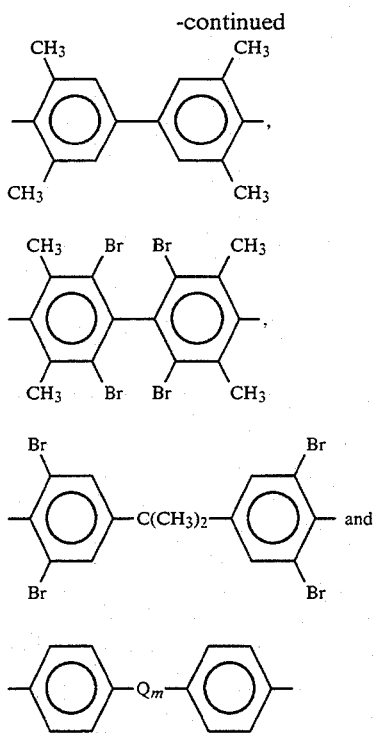

where m is 0 or 1 and Q is a divalent radical of the formula —O—,

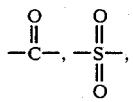

—S— or —C$_x$H$_{2x}$—, and x is a whole number from 1 to 5.

The radical —R'— is a divalent organic radical selected from the class consisting of:

(1) aromatic hydrocarbon radicals having from 6 to 20 carbon atoms and halogenated derivatives thereof;
(2) alkylene radicals and cycloalkylene radicals having from 2 to 20 carbon atoms; and
(3) radicals of the formula:

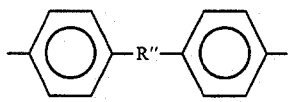

where R" is —O—,

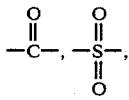

—S— or —C$_y$h$_{2y}$—,
and y is a whole number from 1 to 5.

Such polyetherimides can be formed, for example, by the reaction of an aromatic bis(ether anhydride) of the formula:

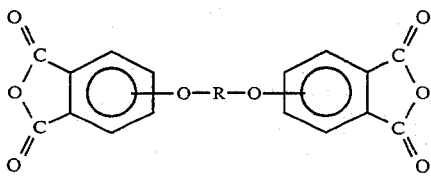

with a diamino compound of the formula:

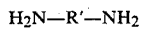

$$H_2N—R'—NH_2$$

Specific examples of polyetherimides useful in the compositions of the invention and methods of making the polyetherimides are disclosed in U.S. Pat. Nos. 3,847,867; 3,847,869; 3,850,885; 3,852,242; 3,855,178; 3,887,588; 4,017,511; 4,024,110 and 4,141,927. These disclosures are incorporated herein by reference.

The novel blend also comprises about 80 to about 35 percent by weight of a copolyester comprising:

1) an acid component comprising terephthalic acid or isophthalic acid or a mixture of said acids and
2) a glycol component comprising a mixture of 1,4-cyclohexanedimethanol and ethylene glycol with from 5 to about 60 mol percent 1,4-cyclohexanedimethanol. The polyester is thus a copolymer having the repeating units,

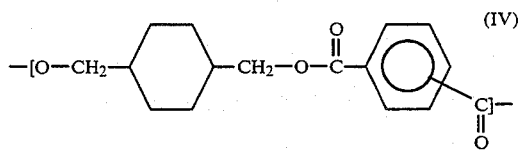

and

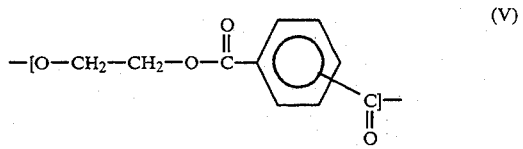

where the mol percent of (IV) in the copolyester is from about 5 to 60 percent. This copolyester can be formed, for example, by the reaction of a mixture of terephthalic acid and isophthalic acid or their equivalent esters with a mixture of the two glycols, 1,4-cyclohexanedimethanol and ethylene glycol.

The copolyesters can be modified by minor amounts of other acids or a mixture of acids (or equivalents esters) including, but not limited to, phthalic acid, 4,4'-stilbene dicarboxylic acid, 2,6-naphthalenedicarboxylic acid, oxalic acid, malonic acid, succinic acid, glutaric acid, adipic acid, pimelic acid, suberic acid, azelaic acid, sebacic acid, 1,12-dodecanedioic acid, dimethylmalonic acid, cis-1,4-cyclohexanedicarboxylic acid and trans-1,4-cyclohexanedicarboxylic acid.

The copolyesters can also be modified by minor amounts of other glycols or a mixture of glycols including, but not limited to, 1,3-trimethylene glycol, 1,4-butanediol, 1,5-pentanediol, 1,6-hexanediol, 1,7-heptanediol, 1,8-octanediol, 1,9-nonanediol, 1,10-decanediol, 1,12-dodecanediol, neopentyl glycol, 2,2,4,4-tetramethyl-1,3-cyclobutanediol, diethylene glycol, bisphenol A and hydroquinone.

Preferably the amounts of modifying acids and glycols are each less than 10 mol percent.

Polyetherimides of the invention which are preferred are those in which:

R is

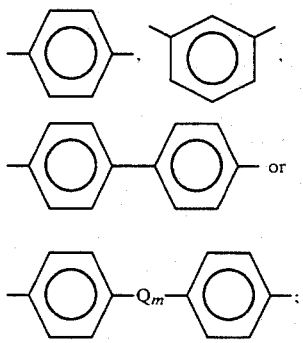

or

R' is an aromatic hydrocarbon radical having from 6 to 10 carbon atoms, or an alkylene or cycloalkylene radical having from 2 to 10 carbon atoms;

R" is —O—,

or —C$_y$H$_{2y}$—;

Q is —O—,

or —C$_x$H$_{2x}$—; and m, x and y are as defined above.

Polyetherimides of the invention which are more preferred as those in which:

R is

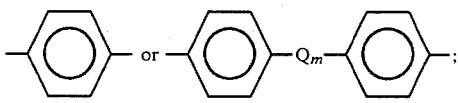

R' is

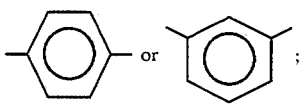

R" is

—C$_y$H$_{2y}$—;

and

Q is

—C$_x$H$_{2x}$—.

Polyetherimides of the invention which are even more preferred are those in which:

R is

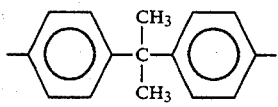

The preferred blends of this invention comprise about 35 to about 55 weight percent of polyetherimide and about 65 to about 45 weight percent of the copolyester. Preferred copolyesters are formed from terephthalic acid and a mixture of glycols in the ratio of 20 to 40 mol percent of 1,4-cyclohexanedimethanol to 60 to 80 mol percent of ethylene glycol. Blends of a copolyester of this composition form clear blends (single phase solid solutions) with polyetherimides in all possible ratios of blending. In addition, blends containing this copolyester have high flexural modulus, i.e., greater than 300,000 psi, and a melt extrusion temperature lower than that of the polyetherimide.

Preferred blends of polyetherimides and copolyesters of the invention are those in which said copolyester has an acid component which comprises 100 to 50 mol percent terephthalic acid and 0 to 50 mol percent isophthalic acid, and a glycol component which comprises from 95 to 40 mol percent ethylene glycol and 5 to 60 mol percent 1,4-cyclohexanedimethanol.

In yet another aspect of the invention, a blend wherein said copolyester has (a) an acid component comprising 100 to 50 mol percent terephthalic acid and 0 to 50 mol percent isophthalic acid and (b) a glycol component comprising 80 to 60 mol percent ethylene glycol and 20 to 40 mol percent 1,4-cyclohexanedimethanol is preferred.

Although the copolyester components of blends are referred to for convenience herein as copolyesters of certain acids and certain glycols, it should be understood that the actual syntheses of the copolyesters can employ any equivalent reactants. For example, instead of a diacid, a corresponding anhydride, ester, or acid halide can be employed.

The blends of the invention may be compounded in the melt, for example, by using a single screw or twin screw extruder. Additional components such as stabilizers, fillers, reinforcements, flame retardants, colorants, lubricants, release agents, impact modifiers, and the like can be included in the formulation.

This invention can be further illustrated by the following examples of preferred embodiments thereof, although it will be understood that these examples are included merely for purposes of illustration and are not intended to limit the scope of the invention unless otherwise specifically indicated. The starting materials are commercially available unless otherwise indicated.

To form the compositions of the examples, polyesters and copolyesters having the compositions listed below were blended with a polyetherimide (PEI). The polyesters and copolyesters were prepared by reacting the dimethyl esters of terephthalic acid (TA) or a mixture of the dimethyl esters of terephthalic acid and isophthalic acid (IA) with ethylene glycol (EG) or with a mixture of ethylene glycol and 1,4-cyclohexanedimethanol (CG). Poly(butylene terephthalate) was also prepared, from the dimethyl ester of terephthalic acid and 1,4-butanediol. By 1,4-cyclohexanedimethanol is mean cis and trans isomers and mixtures thereof.

| Composition of the polyesters and copolyesters | |
|---|---|
| Name | Composition |
| PETG | poly(ethylene-co-cyclohexane-1,4-dimethylene terephthalate) with 69 mol percent ethylene and 31 mol percent cyclohexane-1,4-dimethylene in the glycol |
| PCTG1 | poly(ethylene-co-cyclohexane-1,4-dimethylene terephthalate) with 42 mol percent ethylene and 58 mol percent cyclohexane-1,4-dimethylene in the glycol |
| PCTG2 | poly(ethylene-co-cyclohexane-1,4-dimethylene terephthalate) with 28 mol percent ethylene and 72 mol percent cyclohexane-1,4-dimethylene in the glycol |
| PCT1 | poly(cyclohexane-1,4-dimethylene terephthalate) |
| PCT2 | poly(cyclohexane-1,4-dimethylene terephthalate-co-isophthalate) with 83 mol percent terephthalate and 17 mol percent isophthalate in the acid |
| PBT | poly(butylene terephthalate) |
| PET | poly(ethylene terephthalate) |

The polyetherimide used in these examples was Ultem 1000 ™, which is commercially available from General Electric Company. This polyetherimide is essentially the reaction product of 2,2-bis[4(3,4-dicarboxyphenoxy)phenyl] propane dianhydride:

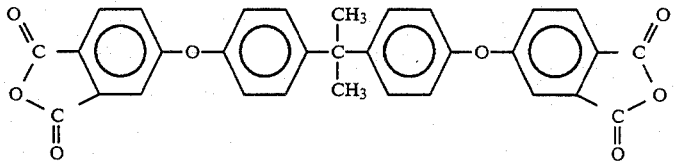

and meta-phenylenediamine.

The blends were compounded in the melt on a Warner and Pfleiderer 28 mm twin screw extruder and molded on a Toyo 90 injection molding machine. The heat deflection temperatures (HDT) were measured according to ASTM D648. The results of the HDT measurements are presented in the tables which follow each example. The first two examples below illustrate compositions of the invention.

EXAMPLES

Example 1

Blends of PETG with PEI were prepared and tested. The results are presented in Table 1. All of these blends were clear and exhibited a single glass transition temperature, Tg. This indicates the existence of a single phase solid solution in these blends. They had a slight yellow color, due to the color of the PEI.

TABLE 1

| | Heat Deflection Temperature Results for Blends of PEI with PETG | | |
|---|---|---|---|
| | Weight Percent | | HDT (°C.) |
| Example | PETG | PEI | at 264 psi |
| 1A | 100 | 0 | 65 |
| 1B | 90 | 10 | — |
| 1C | 80 | 20 | 77 |
| 1D | 70 | 30 | 85 |
| 1E | 60 | 40 | 98 |
| 1F | 50 | 50 | 110 |
| 1G | 40 | 60 | 121 |
| 1H | 30 | 70 | 134 |
| 1I | 20 | 80 | — |
| 1J | 0 | 100 | 188 |

Example 2

Blends of PCTG1 with PEI were prepared and tested. The results are presented in Table 2.

TABLE 2

| | Heat Deflection Temperature Results for Blends of PEI with PCTG1 | | |
|---|---|---|---|
| | Weight Percent | | HDT (°C.) |
| Example | PCTG1 | PEI | at 264 psi |
| 2A | 100 | 0 | 65 |
| 2B | 90 | 10 | — |
| 2C | 80 | 20 | 76 |
| 2D | 70 | 30 | 84 |
| 2E | 60 | 40 | 100 |
| 2F | 50 | 50 | 113 |
| 2G | 40 | 60 | 122 |
| 2H | 30 | 70 | 137 |
| 2I | 20 | 80 | — |
| 2J | 0 | 100 | 188 |

Comparative Example 1

Blends of PCTG2 with PEI were prepared and tested. The results are presented in Table C1.

TABLE C1

| | Heat Deflection Temperature Results for Blends of PEI with PCTG2 | | |
|---|---|---|---|
| | Weight Percent | | HDT (°C.) |
| Example | PCTG2 | PEI | at 264 psi |
| C1A | 100 | 0 | 67 |
| C1B | 90 | 10 | — |
| C1C | 80 | 20 | 74 |
| C1D | 70 | 30 | 81 |
| C1E | 60 | 40 | 87 |
| C1F | 50 | 50 | 92 |
| C1G | 40 | 60 | 119 |
| C1H | 30 | 70 | 141 |
| C1I | 20 | 80 | — |
| C1J | 0 | 100 | 188 |

Comparative Example 2

Blends of PCT1 with PEI were prepared and tested. The results are presented in Table C2.

TABLE C2

| | Heat Deflection Temperature Results for Blends of PEI with PCT1 | | |
|---|---|---|---|
| | Weight Percent | | HDT (°C.) |
| Example | PCT1 | PEI | at 264 psi |
| C2A | 100 | 0 | 70 |
| C2B | 90 | 10 | — |
| C2C | 80 | 20 | 73 |

TABLE C2-continued

Heat Deflection Temperature Results for Blends of PEI with PCT1

| Example | Weight Percent PCT1 | Weight Percent PEI | HDT (°C.) at 264 psi |
|---|---|---|---|
| C2D | 70 | 30 | 80 |
| C2E | 60 | 40 | 82 |
| C2F | 50 | 50 | 87 |
| C2G | 40 | 60 | 110 |
| C2H | 30 | 70 | 148 |
| C2I | 20 | 80 | — |
| C2J | 0 | 100 | 188 |

Comparative Example 3

Blends of PCT2 with PEI were prepared and tested. The results are presented in Table C3.

TABLE C3

Heat Deflection Temperature Results for Blends of PEI with PCT2

| Example | Weight Percent PCT2 | Weight Percent PEI | HDT (°C.) at 264 psi |
|---|---|---|---|
| C3A | 100 | 0 | 66 |
| C3B | 90 | 10 | — |
| C3C | 80 | 20 | — |
| C3D | 70 | 30 | 76 |
| C3E | 60 | 40 | 80 |
| C3F | 50 | 50 | 86 |
| C3G | 40 | 60 | 104 |
| C3H | 30 | 70 | 145 |
| C3I | 20 | 80 | — |
| C3J | 0 | 100 | 188 |

Comparative Example 4

Blends of PBT with PEI were prepared and tested. The results are presented in Table C4.

TABLE C4

Heat Deflection Temperature Results for Blends of PEI with PBT

| Example | Weight Percent PBT | Weight Percent PEI | HDT (°C.) at 264 psi |
|---|---|---|---|
| C4A | 100 | 0 | 52 |
| C4B | 90 | 10 | — |
| C4C | 80 | 20 | 59 |
| C4D | 70 | 30 | 55 |
| C4E | 60 | 40 | 60 |
| C4F | 50 | 50 | 75 |
| C4G | 40 | 60 | 91 |
| C4H | 30 | 70 | — |
| C4I | 20 | 80 | — |
| C4J | 0 | 100 | 188 |

Comparative Example 5

Blends of poly(ethylene terephthalate) (PET) with PEI were prepared and tested. The results were presented in Table C5.

TABLE C5

Heat Deflection Temperature Results for Blends of PEI with PET

| Example | Weight Percent PET | Weight Percent PEI | HDT (°C.) at 264 psi |
|---|---|---|---|
| C5A | 100 | 0 | 63 |
| C5B | 90 | 10 | 70 |
| C5C | 80 | 20 | 74 |
| C5D | 70 | 30 | 83 |
| C5E | 60 | 40 | 94 |
| C5F | 50 | 50 | 104 |
| C5G | 40 | 60 | 117 |

TABLE C5-continued

Heat Deflection Temperature Results for Blends of PEI with PET

| Example | Weight Percent PET | Weight Percent PEI | HDT (°C.) at 264 psi |
|---|---|---|---|
| C5H | 30 | 70 | 128 |
| C5I | 20 | 80 | 142 |
| C5J | 0 | 100 | 188 |

The unexpected advantage of the blends of the present invention is shown in FIGS. 1 and 2. They illustrate the effect of addition of PEI to various polyesters on the heat deflection temperature (HDT) of the blends. FIG. 1 shows the HDT of the blend as a function of the weight fraction of PEI. FIG. 2 shows the increase in HDT resulting from the addition of polyetherimide to the various polyesters. It is clear from FIG. 2 that the inclusion of PETG and PCTG1 in the blend, in accordance with the present invention, results in substantially higher values of HDT compared to addition of PCTG2, PCT1, PCT2, or PBT for a given weight ratio of PEI to polyester when the weight percent of PEI in the blend is about 65 or less. The advantage of PETG and PCTG1 over PET is somewhat less but still significant.

There are other additional advantages associated with the blends of the invention. Their flexural strength and flexural modulus increase with the addition of the polyetherimide to the polyester. In addition, these blends can be processed at a much lower temperature than that which is required for processing the pure polyetherimide.

The blends of the present invention have excellent flexural strength in comparison to other PEI polymer blends. In this respect they are particularly superior to the ternary blends containing PEI, a polyarylate and a polyester, as disclosed in U.S. Pat. No. 4,908,418 to Holub. Example VIII of this patent discloses such a ternary blend containing 33.3 weight percent PEI that has a flexural modulus of 185,000 psi and a flexural strength of 8280 psi. By comparison, as shown in Table 3 below, the binary blend of PEI and PETG of the present invention containing 30 weight percent PEI has a flexural modulus of 366,000 psi and a flexural strength of 14,030 psi. Compositions of the invention thus exhibit superior flexural modulus and strength and combine this strength advantage with melt processability at moderate temperature and relatively high heat deflection temperatures. These compositions have broad applications, including the formation of molded articles, fibers, sheets or films.

Table 3 below further illustrates the valuable mechanical properties of compositions of the invention. It lists the tensile strength, flexural modulus and flexural strength for the series of blends of PEI and PETG reported above in Table 1.

TABLE 3

| Example | Weight Percent PETG | Weight Percent PEI | Tensile Strength* (psi) | Flexural Modulus** (psi) | Flexural Strength** (psi) |
|---|---|---|---|---|---|
| 1A | 100 | 0 | 6,780 | 304,000 | 9,950 |
| 1B | 90 | 10 | — | — | — |
| 1C | 80 | 20 | 8,830 | 348,000 | 12,360 |
| 1D | 70 | 30 | 9,920 | 366,000 | 14,030 |
| 1E | 60 | 40 | 11,070 | 388,000 | 15,500 |
| 1F | 50 | 50 | 12,180 | 414,000 | 17,130 |
| 1G | 40 | 60 | 6,550 | 436,000 | 13,910 |
| 1H | 30 | 70 | 7,030 | 444,000 | 14,260 |
| 1I | 20 | 80 | — | — | — |

TABLE 3-continued

| Example | Weight Percent | | Tensile Strength* (psi) | Flexural Modulus** (psi) | Flexural Strength** (psi) |
|---|---|---|---|---|---|
| | PETG | PEI | | | |
| 1J | 0 | 100 | 15,930 | 527,000 | 22,270 |

*Tensile properties measured according to ASTM D638
**Flexural properties measured according to ASTM D790

Although blends of PEI and PET as listed in Table C5 above also have good flexural strengths, they suffer from the previously noted disadvantage of heat deflection temperatures that are several degrees lower than those of blends of the invention having the same weight ratios of PEI to polyester.

The invention has been described in detail with particular reference to preferred embodiments thereof, but it will be understood that variations and modifications can be effected within the spirit and scope of the invention. Moreover, all patents, patent applications (published and unpublished, foreign or domestic), literature references or other publications noted above are incorporated herein by reference for any disclosure pertinent to the practice of this invention.

We claim:

1. A thermoplastic polymer blend comprising
   (A) about 20 to 65 weight percent of a polyetherimide and
   (B) about 80 to 35 weight percent of copolyester of
      (a) an acid component comprising terephthalic acid or isophthalic acid or mixture of said acids, and
      (b) a glycol component comprising about 40 to about 70 mol percent ethylene glycol and about 30 to about 60 mol percent 1,4-cyclohexanedimethanol.

2. A polymer blend according to claim 1 wherein said copolyester is poly(ethylene-co-cyclohexane-1,4-dimethylene terephthalate) and said blend is clear.

3. A polymer blend according to claim 2 wherein said glycol component comprises about 65 to about 70 percent ethylene glycol and about 35 to about 30 mol percent 1,4-cyclohexane dimethanol.

4. A polymer blend according to claim 1 comprising
   (A) about 20 to about 65 weight percent of a polyetherimide having repeating units of the formula:

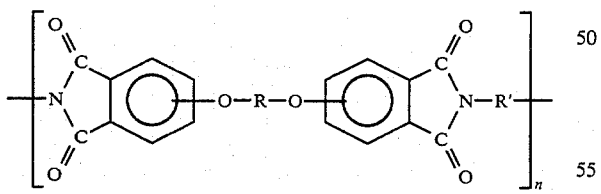

where n is a whole number greater than 1; the radical —O—R—O— is in the 3- or 4- and 3'- or 4'-positions,
the radical —R— is a member of the class consisting of:

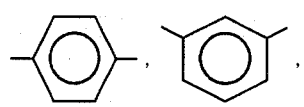

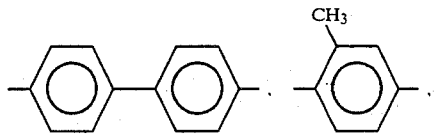

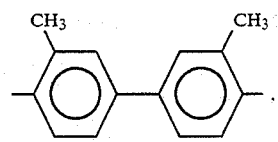

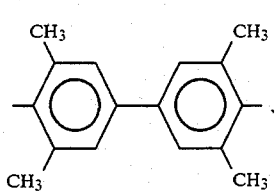

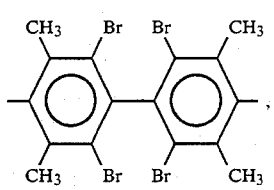

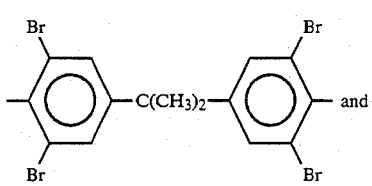

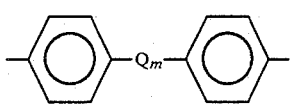

where m is 0 or 1 and Q is a divalent radical of the formula: —O—,

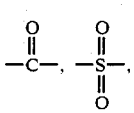

—S— or —C$_x$H$_{2x}$—, and
x is a whole number from 1 to 5; the radical —R'— is a divalent organic radical selected from the class consisting of:

(1) aromatic hydrocarbon radicals having from 6 to 20 carbon atoms and halogenated derivatives thereof;
(2) alkylene and cycloalkylene radicals having from 2 to 20 carbon atoms; and
(3) radicals of the formula:

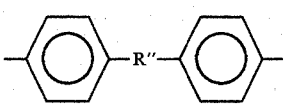

where R" is —O—,

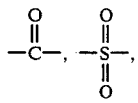

—S— or —$C_yH_{2y}$—, and y is a whole number from 1 to 5; and (B) about 80 to about 35 weight percent of a copolyester of (a) an acid component comprising terephthalic acid or isophthalic acid or a mixture of said acids and (b) a glycol component comprising about 40 to about 70 mol percent ethylene glycol about 30 to about 60 mol percent 1,4-cyclohexanedimethanol.

5. A polymer blend according to claim 4 wherein the radical —R— in said polyetherimide is a member of the class consisting of:

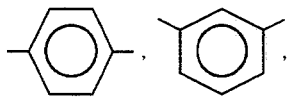

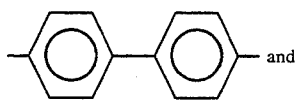

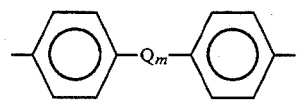

where m is 0 or 1 and Q is a divalent radical of the formula —O—,

or —$C_xH_{2x}$—; and R" is —O—,

or —$C_yH_{2x}$—.

6. A blend according to claim 5 where —R— is

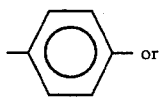

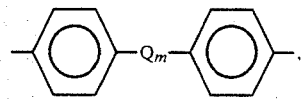

Q is a divalent radical of the formula —$C_xH_{2x}$—; and R" is a divalent radical of the formula —$C_yH_{2y}$—.

7. A polymer blend according to claim 6 where —R— is

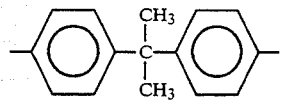

—R'— is a divalent organic radical selected from the class consisting of:

(1) aromatic hydrocarbon radicals having from 6 to 10 carbon atoms; and (2) alkylene radicals and cycloalkylene radicals having from 2 to 10 carbon atoms.

8. A polymer blend according to claim 7 where —R'— of the polyetherimide is

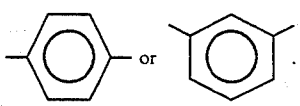

9. A polymer blend according to claim 8 wherein the acid component of said copolyester comprises 100 to 50 mol percent terephthalic acid and 0 to 50 mol percent isophthalic acid, and the glycol component comprises from about 40 to about 70 mol percent ethylene glycol and about 30 to about 60 mol percent 1,4-cyclohexanedimethanol.

10. A polymer blend according to claim 8 which comprises (A) about 35 to about 55 weight percent of said polyetherimide and (B) about 60 to 85 weight percent of said copolyester.

11. A polymer blend according to claim 8 wherein the glycol component of said copolyester comprises about 60 to about 70 percent ethylene glycol and about 30 to about 40 mol percent 1,4-cyclohexanedimethanol.

12. A polymer blend according to claim 10 wherein said copolyester has (a) an acid component comprising 100 to 50 mol percent terephthalic and 0 to 50 mol percent isophthalic acid and (b) a glycol component comprising about 60 to about 70 percent ethylene glycol and about 60 to about 40 percent 1,4-cyclohexanedimethanol.

13. A polymer blend according to claim 1 that has a flexural modulus greater than about 300,000 psi.

* * * * *

UNITED STATES PATENT AND TRADEMARK OFFICE
CERTIFICATE OF CORRECTION

PATENT NO. : 5,439,987
DATED : August 8, 1995
INVENTOR(S) : Christopher E. Scott, et al.

It is certified that error appears in the above-indentified patent and that said Letters Patent is hereby corrected as shown below:

Column 13, line 15 (Claim 4), between "glycol" and "about", --- and --- should be inserted.

Column 13, line 51 (Claim 5, last line), the formula should read $$--- \quad -C_yH_{2y}- \quad ---.$$

Column 14, line 14 (Claim 7), after the formula, "and" should be added.

Column 14, line 54 (Claim 12, line 7), "60" should be --- 30 ---

Signed and Sealed this

Twenty-fourth Day of October, 1995

Attest:

BRUCE LEHMAN

*Attesting Officer*     *Commissioner of Patents and Trademarks*